United States Patent Office 2,894,030
Patented July 7, 1959

2,894,030

N-BENZHYDRYL-S-(ω-DILOWER ALKYLAMINO-ALKYL) PSEUDOTHIOUREAS AND THEIR PSEUDOTHIOURONIUM SALTS

Stanley O. Winthrop, Montreal, Quebec, Canada, assignor to American Home Products Corporation, New York, N.Y., a corporation of Delaware No Drawing. Application March 11, 1958
Serial No. 720,532

7 Claims. (Cl. 260—564)

This invention relates to new basic S-substituted derivatives of N-benzhydryl pseudothioureas, and to salts of these compounds. The substituent attached to sulfur is an ω-dilower alkylaminoalkyl substituent. The novel chemical compounds are therefore the N-benzhydryl-S-(ω-dilower alkylaminoalkyl)pseudothioureas and the salts of these bases, particularly the acid addition salts.

My invention is especially concerned with N-benzhydryl-S-(β-dilower alkylaminoethyl)pseudothioureas and the corresponding pseudothiouronium salts, especially those formed by the addition of hydrohalic acids.

My new compounds, in base form, may be represented by the generic structural formula

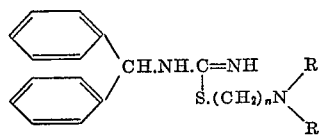

where R represents lower alkyl and $n$ is an integer either 2 or 3.

Where $n$ represents the integer 2, and the substituent attached to sulfur is a β-dilower alkylaminoethyl substituent, my new compounds, in base form, may be represented by the following structural formula

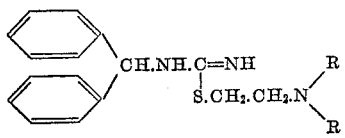

where R represents lower alkyl.

It should be understood, of course, that the structural formulae given represent the new bases in one of the tautomeric forms possible, and that the compounds, in a different tautomeric form, may be represented structurally by a somewhat different formula.

My invention also relates to salts of these S-substituted pseudothiourea bases, more particularly to the acid addition salts of these bases. I have found the acid addition salts with hydrohalic acids, such as salts with hydrochloric acid, hydrobromic acid and hydroiodic acid, to be especially desirable.

The new chemical compounds, both in base form, and in the form of their acid addition salts, possess valuable pharmacological properties, being particularly suitable as antispasmodics with special musculotropic character.

In the amounts administered for these purposes they are non-toxic. Many of the new compounds also possess useful properties in stimulating the central nervous system.

The new compounds, in salt form, are readily prepared by reacting N-benzhydryl thiourea and a dilower alkyl-aminoalkyl halide hydrohalide, the reactants being brought together in a suitable inert solvent such as ethanol or isopropanol. Preferably, the solution is refluxed, and the desired product crystallized out from the reaction mixture and purified by recrystallization from a suitable solvent or mixed solvent. Substantially equimolar amounts of the reactants are preferably employed.

This results in the N-benzhydryl-S-(ω-dilower alkylaminoalkyl)pseudothiouronium salts, and the corresponding base can be secured by treating the salt with sodium carbonate in an aqueous medium, preferably in an aqueous methanol medium.

Details of these procedures are given in the following illustrative examples:

EXAMPLE 1

*N-benzhydryl-S-(β-diisopropylaminoethyl)pseudo-thiouronium chloride hydrochloride*

8.0 grams (0.033 mole) of N-benzhydrylthiourea and 6.6 grams (0.033 mole) of diisopropylaminoethylchloride hydrochloride were dissolved in 150 milliliters of isopropanol and the solution was refluxed for 2 days. The isopropanol was then removed by evaporation in vacuo, i.e. at a reduced pressure less than atmospheric, and the oil residue was crystallized from a mixture of isopropanol and ether. There was thus obtained 10.9 grams of a white solid product which was N-benzhydryl-S-(β-diisopropylaminoethyl)pseudothiouronium chloride hydrochloride. After two recrystallizations from the isopropanol-ether mixture, a purified product was obtained which melted at 205–208° C. Analysis confirmed the empiric formula $C_{22}H_{33}N_3SCl_2$.

EXAMPLE 2

*N-benzhydryl-S-(β-diethylaminoethyl)pseudo-thiouronium chloride hydrochloride*

8.0 grams (0.033 mole) of N-benzhydrylthiourea and 5.7 grams (0.033 mole) of diethylaminoethylchloride hydrochloride were dissolved in 150 milliliters of isopropanol and the solution refluxed for 2 days. The isopropanol was then removed by evaporation in vacuo, i.e. at a pressure less than atmospheric, resulting in an oil residue which was crystallized from isopropanol-ether. The white product was N-benzhydryl-S-(β-diethylaminoethyl)pseudothiouronium chloride hydrochloride. Upon recrystallization three times from a mixture of isopropanol and ether, the purified product, melting at 176–178.5° C., was secured. Analysis confirmed the empiric formula $C_{20}H_{29}N_3SCl_2$.

EXAMPLE 3

*N-benzhydryl-S-(β-dimethylaminoethyl)pseudo-thiouronium iodide hydroiodide*

9.4 grams (0.039 mole) of N-benzhydrylthiourea and 12.7 grams (0.039 mole) of dimethylaminoethyliodide hydroiodide were dissolved in 200 milliliters of ethanol and the solution was refluxed for 3 hours. After cooling overnight, needle-like crystals of N-benzhydryl-S-(β-dimethylaminoethyl)pseudothiouronium iodide hydroiodide came out of solution. This solid was recrystallized twice from ethanol to yield a purified product melting at 189–191° C. Analysis confirmed the impiric formula $C_{18}H_{25}N_3SI_2$.

EXAMPLE 4

*N-benzhydryl-S-(β-diisopropylaminoethyl)pseudothiourea*

1.0 gram of N-benzhydryl-S-(β-diisopropylaminoethyl)-pseudothiouronium chloride hydrochloride, as prepared in Example 1, was dissolved in aqueous methanol, and a solution of sodium carbonate was added thereto. This resulted in precipitation of an oil which would not solidify. This oil was taken up in chloroform and dried over sodium sulfate. The chloroform was then removed by evaporation in vacuo, i.e. at a pressure less than atmospheric, leaving behind 0.5 gram of a free base, N-benzhydryl-S-(β-diisopropylaminoethyl)pseudothiourea as a heavy viscous liquid. Analysis confirmed the empiric formula $C_{22}H_{31}N_3S$.

I claim:

1. A compound selected from the group which consistes of bases of the formula

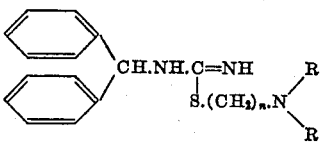

where R represents lower alkyl and $n$ is an integer from 2 to 3; and hydrohalide salts of said bases.

2. A compound of the formula

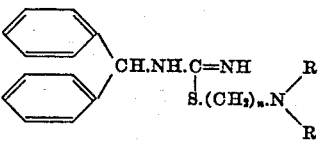

where R represents lower alkyl and $n$ is an integer from 2 to 3.

3. A compound of the formula

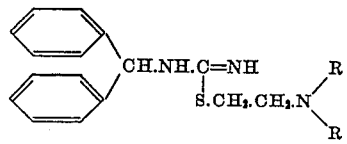

where R represents lower alkyl.

4. N-benzhydryl - S - (β-diisopropylaminoethyl)pseudothiourea.

5. N-benzhydryl - S - (β - dimethylaminoethyl)pseudothiouronium iodide hydroiodide.

6. N-benzyhydryl - S - (β - diethylaminoethyl)pseudothiouronium chloride hydrochloride.

7. N-benzhydryl - S - (β-diisopropylaminoethyl)pseudothiouronium choride hydrochloride.

References Cited in the file of this patent

Borovicka et al.: Chemical Abstracts, vol. 45, p. 577 (1951).

Exner et al.: Chemical Abstracts, vol. 49, p. 1664 (1955).

Wheeler: American Chemical Journal, vol. 26 (1901), p. 353.

Kaye et al.: J.A.C.S., vol. 74 (1952), pp. 403 to 407.